US012131058B2

(12) United States Patent
Ryabinin et al.

(10) Patent No.: US 12,131,058 B2
(45) Date of Patent: Oct. 29, 2024

(54) CONFIGURABLE ARITHMETIC HW ACCELERATOR

(71) Applicant: Western Digital Technologies, Inc., San Jose, CA (US)

(72) Inventors: Yuri Ryabinin, Beer Sheva (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/726,755

(22) Filed: Apr. 22, 2022

(65) Prior Publication Data

US 2023/0342070 A1   Oct. 26, 2023

(51) Int. Cl.
    *G06F 3/06*   (2006.01)
(52) U.S. Cl.
    CPC .......... *G06F 3/0655* (2013.01); *G06F 3/0604* (2013.01); *G06F 3/0679* (2013.01)
(58) Field of Classification Search
    CPC ..... G06F 3/0655; G06F 3/0679; G06F 3/0604
    See application file for complete search history.

(56) References Cited

U.S. PATENT DOCUMENTS

| 9,626,286 | B2 | 4/2017 | Gorobets et al. |
| 10,824,568 | B2 | 11/2020 | Benisty et al. |
| 11,537,329 | B1* | 12/2022 | Shen ....................... G06F 3/064 |
| 2020/0081830 | A1* | 3/2020 | Desai .................. G06F 12/0246 |
| 2020/0371964 | A1* | 11/2020 | Bhoria ................ G06F 12/0864 |
| 2020/0401509 | A1 | 12/2020 | Hsu |
| 2021/0255956 | A1 | 8/2021 | Kuyel |
| 2022/0188316 | A1* | 6/2022 | Lagrange Moutinho Dos Reis .... G06F 16/24549 |
| 2023/0185463 | A1* | 6/2023 | Cho ...................... G06F 3/0659 711/163 |

FOREIGN PATENT DOCUMENTS

CN   214376421 U   10/2021

* cited by examiner

*Primary Examiner* — David E Martinez
(74) *Attorney, Agent, or Firm* — PATTERSON + SHERIDAN, LLP

(57) ABSTRACT

A data storage device includes a memory device and a controller coupled to the memory device. The controller includes a decoder multiplexer (mux) module, a plurality of request/response channels coupled to the decoder mux module, an arithmetic pipeline module coupled to the plurality of request/response channels, an arbiter module coupled to the plurality of request/response channels and the arithmetic pipeline module, a mux/arbiter module coupled to the arithmetic pipeline module, a random access memory (RAM) access module coupled to the decoder mux module and the mux/arbiter module, and a RAM coupled to the mux/arbiter module. The controller is configured to determine a pipeline depth value and a calculation parallelism value of the arithmetic pipeline module and configure the arithmetic pipeline module based on the determining.

12 Claims, 7 Drawing Sheets

CONFIGURABLE ARITHMETIC HW ACCELERATOR

BACKGROUND OF THE DISCLOSURE

Field of the Disclosure

Embodiments of the present disclosure generally relate to data storage devices, such as solid state drives (SSDs), and, more specifically, accelerating arithmetic calculations executed by a data storage device.

Description of the Related Art

As demands on sequential and random read/write data writes of data storage devices, such as SSDs, continue to grow, a bottleneck may occur due to firmware performance and may become more evident as the demands increase. Logical-to-physical translations may be completed in a flash translation layer (FTL) of the data storage device, where the FTL may not be able to handle the increasing demands. Thus, a bottleneck may occur during logical-to-physical translation computations, which may impact overall data storage device performance.

The logical-to-physical translation computations may be completed in software code of the FTL. However, because the logical-to-physical translation computations are completed in the software code of the FTL, calculations may not be parallelized and arithmetic operations, such as division and multiplication, may be implemented iteratively using other operations (e.g., subtraction, addition, and shift). Thus, system resources and bandwidth may be over utilized in order to perform the abovementioned calculations. Even if arithmetic operations, such as division and multiplication, may be implemented efficiently by the software code, independent calculations may still not be implemented in parallel.

Therefore, there is a need in the art for a hardware accelerator to speed up logical-to-physical translation calculations while having flexibility of adapting to different logical-to-physical translation calculation requirements.

SUMMARY OF THE DISCLOSURE

The present disclosure generally relates to data storage devices, such as solid state drives (SSDs), and, more specifically, accelerating arithmetic calculations executed by a data storage device. A data storage device includes a memory device and a controller coupled to the memory device. The controller includes a decoder multiplexer (mux) module, a plurality of request/response channels coupled to the decoder mux module, an arithmetic pipeline module coupled to the plurality of request/response channels, an arbiter module coupled to the plurality of request/response channels and the arithmetic pipeline module, a mux/arbiter module coupled to the arithmetic pipeline module, a random access memory (RAM) access module coupled to the decoder mux module and the mux/arbiter module, and a RAM coupled to the mux/arbiter module. The controller is configured to determine a pipeline depth value and a calculation parallelism value of the arithmetic pipeline module and configure the arithmetic pipeline module based on the determining.

In one embodiment, a data storage device includes a memory device and a controller coupled to the memory device. The controller includes a decoder multiplexer (mux) module, a plurality of request/response channels coupled to the decoder mux module, an arithmetic pipeline module coupled to the plurality of request/response channels, an arbiter module coupled to the plurality of request/response channels and the arithmetic pipeline module, a mux/arbiter module coupled to the arithmetic pipeline module, a random access memory (RAM) access module coupled to the decoder mux module and the mux/arbiter module, and a RAM coupled to the mux/arbiter module.

In another embodiment, a data storage device includes a memory device and a controller coupled to the memory device. The controller includes an arithmetic pipeline module. The controller is configured to determine a pipeline depth value and a calculation parallelism value of the arithmetic pipeline module and configure the arithmetic pipeline module based on the determining. The pipeline depth value is a number of stages to perform a series of calculations and the calculation parallelism value is a number of parallel arithmetic elements of each calculation of the series of calculations. Each calculation of the series of calculations includes a plurality of distinct arithmetic elements.

In another embodiment, a data storage device includes memory means and a controller coupled to the memory means. The controller includes a plurality of multiplexers, a plurality of arithmetic elements, and a plurality of registers and/or a plurality of flip-flops. The controller is configured to determine a pipeline depth value and a calculation parallelism value and configure an arithmetic pipeline module based on the pipeline depth value and the calculation parallelism value. The configuring includes selecting and deselecting one or more multiplexers of the plurality of multiplexers, one or more arithmetic elements of the plurality of arithmetic elements, and one or more registers of the plurality of registers and/or one or more flip flops of the plurality of flip-flops.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, accelerating arithmetic calculations executed by a data storage device. A data storage device includes a memory device and a controller coupled to the memory device. The controller includes a decoder multiplexer (mux) module, a plurality of request/response channels coupled to the decoder mux module, an arithmetic pipeline module coupled to the plurality of request/response channels, an arbiter module coupled to the plurality of request/response channels and the arithmetic pipeline module, a mux/arbiter module coupled to the arithmetic pipeline module, a random access memory (RAM) access module coupled to the decoder mux module and the mux/arbiter module, and a RAM coupled to the mux/arbiter module. The controller is configured to determine a pipeline depth value and a calculation parallelism value of the arithmetic pipeline module and configure the arithmetic pipeline module based on the determining.

Figure 1:
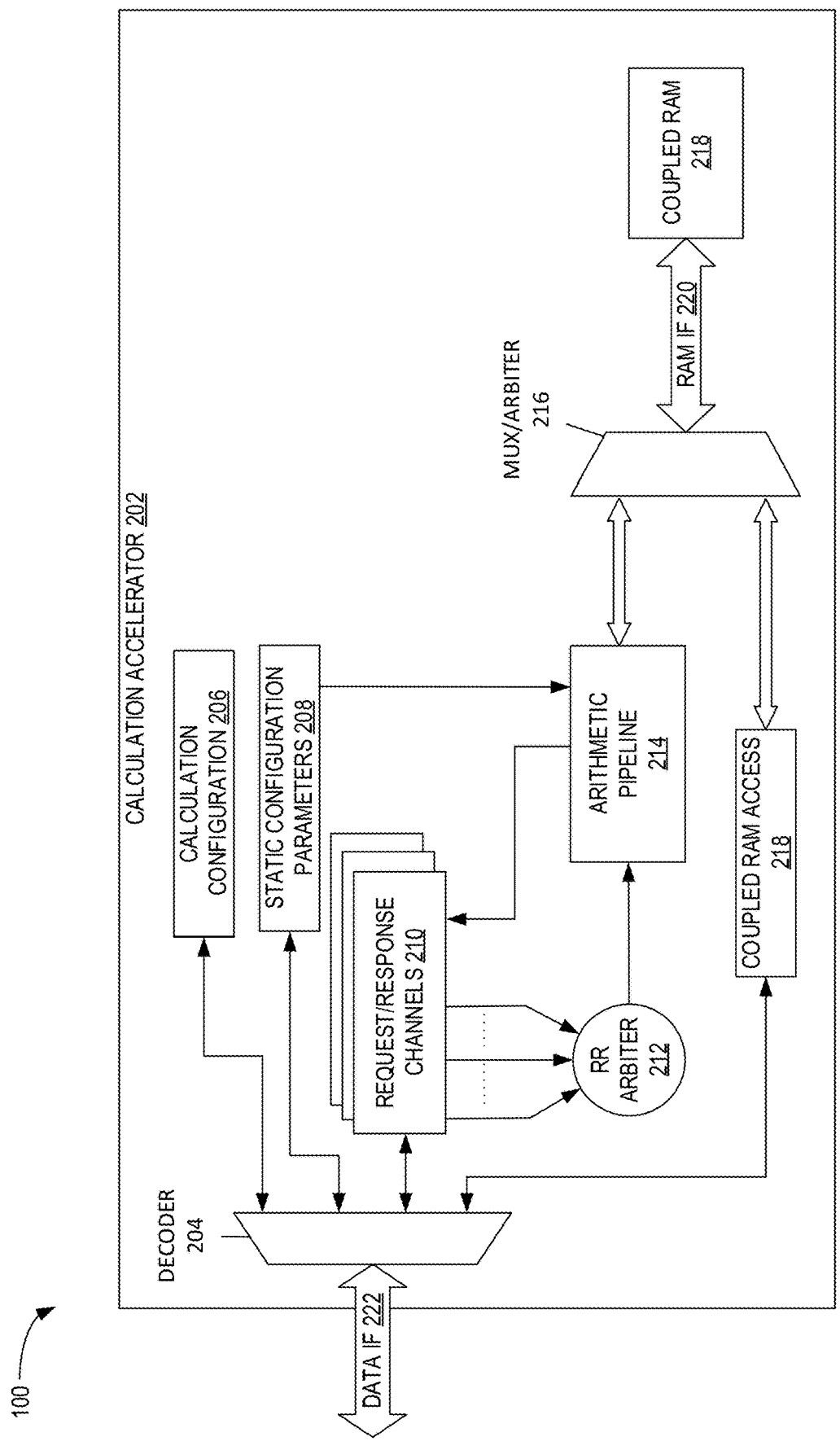
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a flash translation layer (FTL) 150, where the FTL 150 includes a calculation accelerator module 152. The calculation accelerator module 152 may be a physical component embedded in the FTL 150 and/or the controller 108. The FTL 150 may be configured to manage data mappings of the data storage device 106, such as generating a logical block address (LBA) to physical block address (PBA) mapping. For example, if the host device 104 provides a read command to read data from an LBA range of the NVM 110, the FTL 150 converts the LBA range into a corresponding PBA range of the NVM 110. In other words, the PBA range may correspond to the physical location of where the data is stored on the NVM 110.

The calculation accelerator module 152 may be configured to perform one or more arithmetic calculations to translate LBAs to PBAs. Because the calculation accelerator module 152 includes hardware specifically designated for the calculations, the calculations may be performed efficiently and with low latency. During data storage device 106 operation, the calculation accelerator module 152 may be provided a LBA to PBA translation calculation command associated with one or more read or write commands, where the one or more read or write commands may be sequential or random commands, via a register interface or any other applicable control interface of the controller 108. Furthermore, the calculations may be completed in a pipelined manner, which may allow for access by one or more CPUs or firmware threads (e.g., applications, host devices, etc.). Furthermore, at least a portion of the data/parameters utilized by the calculation accelerator module 152 may be placed in a coupled RAM. For example, the coupled RAM may be internal to the controller 108, such as SRAM or DRAM. In another example, the coupled RAM may be external to the controller 108, where the coupled RAM may be the volatile memory 112, external SRAM, and/or external DRAM. It is contemplated that MRAM may be applicable to the described embodiments.

Figure 2:
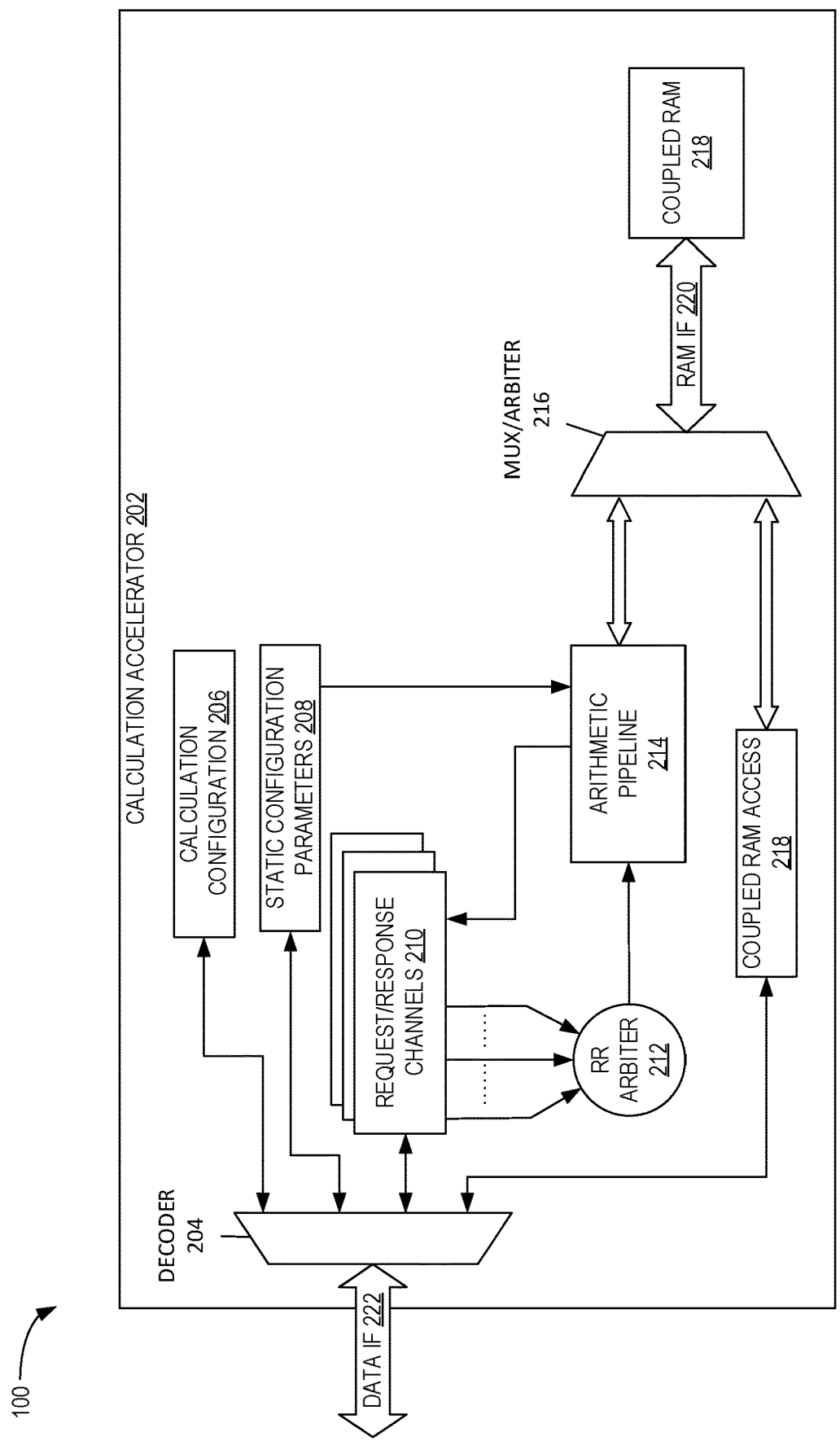
FIG. 2 is a schematic block diagram of a calculation accelerator module, according to certain embodiments.

FIG. 2 is a schematic block diagram of a calculation accelerator module 202, according to certain embodiments. The calculation accelerator module 202 may be the calculation accelerator module 152 of FIG. 1. For exemplary purposes, aspects of the storage system 100 of FIG. 1 may be referenced herein. The calculation accelerator module 202 includes a decoder 204, a calculation configuration module 206 coupled to the decoder 204, a static configuration parameters module 208 coupled to the decoder 204, a plurality of request/response channels 210 coupled to the decoder 204 and a coupled RAM 218 coupled to the decoder 204. The calculation accelerator module 202 further includes a request arbiter 212, which may be a queuing module coupled to the plurality of request/response channels 210, an arithmetic pipeline module 214 coupled to the plurality of request/response channels 210, the request arbiter 212, and the static configuration parameters module 208, a multiplexer (mux)/arbiter module 216 coupled to the arithmetic pipeline module 214 and the coupled RAM 218, and a coupled RAM 218 coupled to the mux/arbiter module 216. Data is transferred to/from the calculation accelerator module 202 via a data interface (IF) 222. Likewise, data is transferred to/from the coupled RAM 218 via a RAM IF 220. The request arbiter 212, herein referred to as arbiter 212 for simplification purposes, may utilize any arbitration scheme relevant to the disclosed embodiments. For example, a round robin arbitration scheme may be employed by the arbiter 212. In another example, a queueing logic may be implemented by the arbiter 212 so that requests may not arrive simultaneously to the arithmetic pipeline module 214.

The static configuration parameters module 208 stores a plurality of static parameters to be used by the arithmetic pipeline module 214. The static parameters may be determined and/or generated by the firmware of the controller 108 during an initialization phase of the data storage device 106 or the calculation accelerator module 202 usage. Examples of static configuration parameters include a size of the NVM, such as the number of data blocks of the NVM, the number of NVM dies/chips, parameters defining a translation of the LBA to PBA, and the like. The calculation configuration module 206 includes definitions of the construction of the calculations of the arithmetic pipeline module 214. The definitions may be determined and/or generated by the firmware of the controller 108 during an initialization phase of the data storage device 106 or the calculation accelerator module 202 usage. The plurality of request/response channels 210 may be utilized by the firmware of the controller 108 to activate the arithmetic pipeline module 214, where the results of the arithmetic pipeline module 214 are provided back to the firmware by the plurality of request/response channels 210. The dynamic parameters of a calculation operation by the arithmetic pipeline module 214 are provided to arithmetic pipeline module 214 by the command control registers, which may be specific to each request/response channel of the plurality of request/response channels 210. Examples of dynamic parameters include LBAs or its components, such as a logical ID of the NVM block associated with the LBA, an offset of the memory unit inside the NVM block, and the like. Each CPU or firmware thread in the data storage device 106 may have a dedicated request/response channel of the plurality of request/response channels 210.

The request arbiter 212 arbitrates between the plurality of request/response channels 210. Furthermore, the arbitration may occur when there are one or more outstanding requests stored in the plurality of request/response channels 210. The coupled RAM 218 may be used by the controller 108 to load the required content to the coupled RAM 218. For example, required content may include a table mapping LBAs to PBAs of the NVM, such as mapping LBAs to blocks or dies of the NVM. Furthermore, the coupled RAM 218 may store configurations/databases that may be too large to be stored in registers. For example, due to the size of the configuration/database, the calculation configuration module 206 and the static configuration parameters module 208 may indicate to the controller 108 to retrieve the configuration/database from the coupled RAM 218 and provide the retrieved configuration/database to the arithmetic pipeline module 214.

Figure 3:
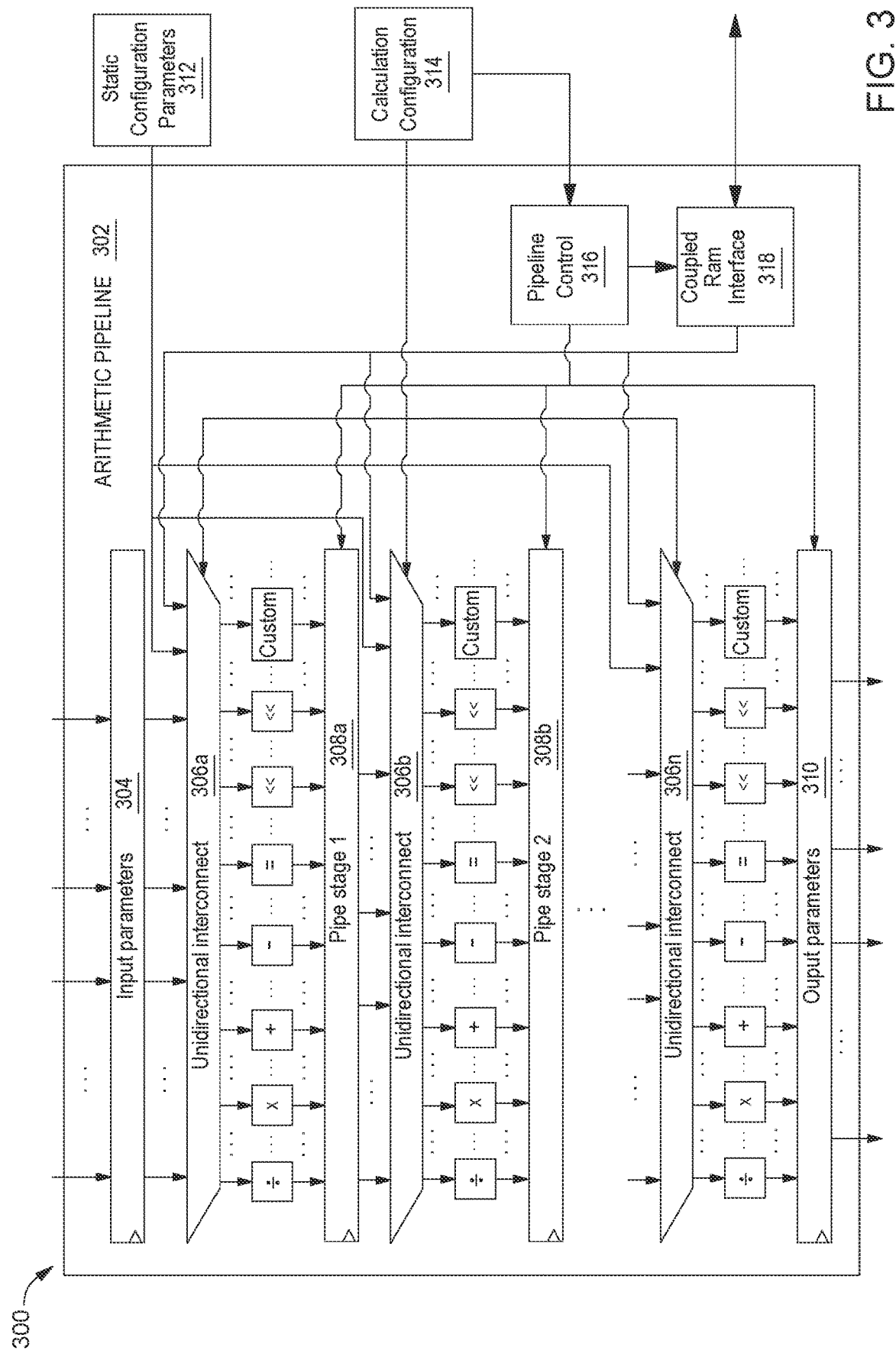
FIG. 3 is an exemplary illustration of an arithmetic pipeline module, according to certain embodiments.

FIG. 3 is an exemplary illustration of an arithmetic pipeline module 302, according to certain embodiments. The arithmetic pipeline module 302 may be the arithmetic pipeline module 214 of FIG. 2. The arithmetic pipeline module 302 is coupled to the static configuration parameters modules 312, which may be static configuration parameters module 208 of FIG. 2, and the calculation configuration module 314, which may be the calculation configuration module 206 of FIG. 2. The arithmetic pipeline module 302 includes a pipeline control module 316, where the pipeline control module 316 is coupled to the calculation configuration module 314, and a coupled RAM interface, where the coupled RAM interface is coupled to the pipeline control module 316 and a coupled RAM, such as the coupled RAM 218 of FIG. 2.

The arithmetic pipeline module 302 includes an input parameters module 304 and an output parameters module 310. The arithmetic pipeline module 302 includes a plurality of pipe stages 308a-308n (pipe stage 308n not shown) and a plurality of unidirectional interconnects 306a-306n. In some examples, the pipe stage 308n may be the output parameters module 310. In other examples, the pipe stage 308n may be a last pipe stage before the output parameters module 310. The plurality of unidirectional interconnects 306a-306n may be registers or flip-flops, which may be considered as sampling elements. A sampling element may refer to an iteration of applying arithmetic elements to an input. An unidirectional interconnect of the plurality of unidirectional interconnects 306a-306n is located between the input parameters module 304 and a first unidirectional interconnect 306a, between adjacent unidirectional interconnects of the plurality of unidirectional interconnects 306a-306n, and between an n-th unidirectional interconnect 306n and the output parameters module 310. A number of unidirectional interconnects of the plurality of unidirectional interconnects 306a-306n may be one more than a number of pipes stages of the plurality of pipe stages 308a-308n.

Furthermore, the number of pipe stages of the plurality of pipe stages 308a-308n may be configurable by the pipeline control module 316. For example, the pipeline control module receives the calculation configurations from the calculation configuration module 314 and sets the number of pipe stages for the arithmetic pipeline. The calculation configurations may be based on workload type, latency requirements, bandwidth availability, timing requirements, memory space availability, and power per application. An application may be any relevant device or system that may be coupled to a data storage device having the arithmetic pipeline module 302. Each unidirectional interconnect of the plurality of unidirectional interconnects 306a-306n provides either the results of the previous calculations from a previous stage or the input parameters to a series of arithmetic elements. Each unidirectional interconnect may be statically controlled that allows routing of the inputs, static and dynamic parameters, and intermediate results to the arithmetic elements. The arithmetic elements may be configurable and includes, but not limited to, dividers, multipliers, adders, subtractors, comparators, shifters, custom equations/logic, and the like. Not all of the arithmetic elements may be utilized for each pipe stage. Furthermore, the arithmetic elements may be defined or configured in advance, such as when the controller 108 is initiated. The structure of the arithmetic pipeline module 302 (e.g., the number of pipe stages, unidirectional interconnects, and configurable arithmetic elements) may allow for parallelization of calculations.

The static configuration parameters module 312 provides the static configuration parameters to each of the plurality of unidirectional interconnects 306a-306n. The pipeline control module 316 manages the operations of the arithmetic pipeline module 302 according to the values residing in the calculation configuration module 314. The calculation configuration module 314 includes configuration registers per arithmetic pipeline stage and per arithmetic operand. The values of the registers may control the routing of inputs to each arithmetic element and each calculation result sampling. The input parameters module 304 receives an input from a request/response channel, which may be one of the request/response channels of the plurality of request/response channels 210, or the request arbiter 212. Likewise, the output parameters module 310 provides the results of the arithmetic operations to the relevant request/response channel of the plurality of request/response channels 210.

Figure 4:
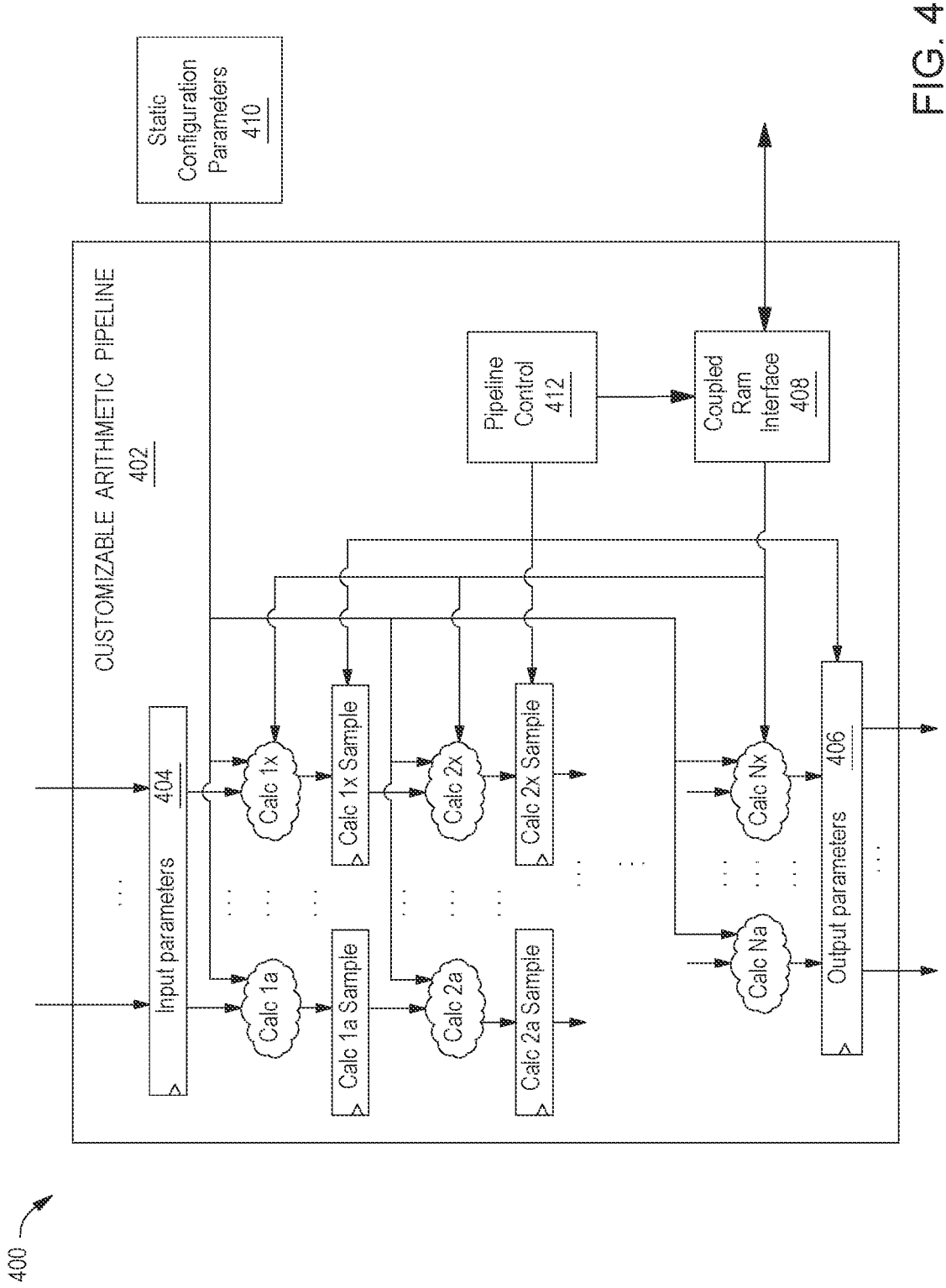
FIG. 4 is an exemplary illustration of a customizable arithmetic pipeline module, according to certain embodiments.

FIG. 4 is an exemplary illustration of a customizable arithmetic pipeline module 402, according to certain embodiments. The customizable arithmetic pipeline module 402 may be the arithmetic pipeline module 214 of FIG. 2. The customizable arithmetic pipeline module 402 is coupled to the static configuration parameters modules 410, which may be static configuration parameters module 208 of FIG. 2. For simplification purposes, common elements between the arithmetic pipeline module 302 of FIG. 3 and the customizable arithmetic pipeline module 402, such as the pipeline control module 412, the coupled RAM interface 408, the pipeline control module 412, the input parameters module 404, and the output parameters module 406, may not be described herein.

The arithmetic elements of each pipe stage may be custom calculations. For example, "calc", such as "Calc 1a", "Calc 1x", etc., may refer to a custom, algorithm-specific logic. Thus, a calculation configuration module, such as the calculation configuration module 314 of FIG. 3, may not be needed. However, the calculation configuration module 314 may still be present in the embodiments of the customizable arithmetic pipeline module 402.

Figure 5:
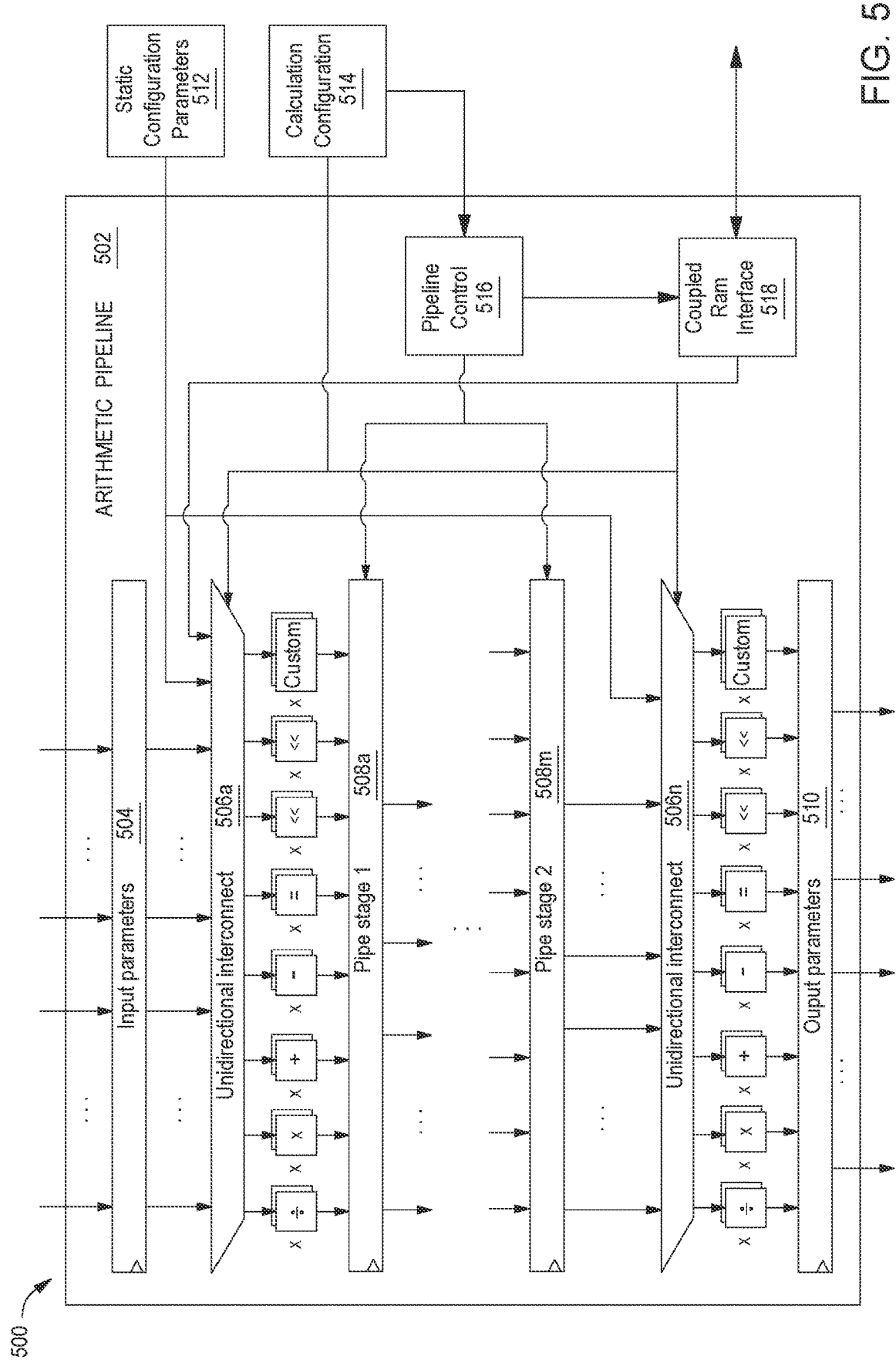
FIG. 5 is an exemplary illustration of an arithmetic pipeline module configured based on a pipeline depth value and a calculation parallelism value, according to certain embodiments.
Figure 6:
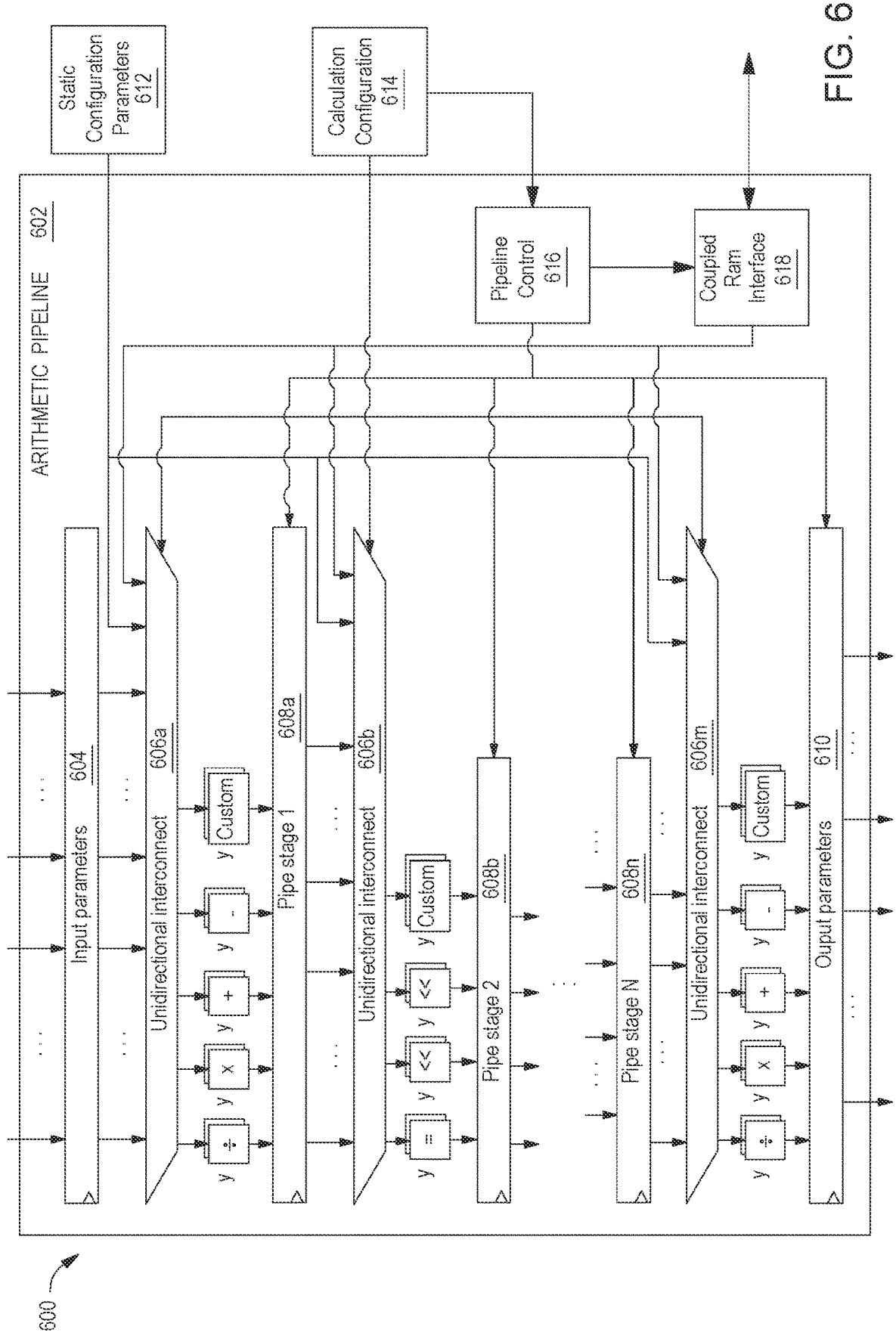
FIG. 6 is an exemplary illustration of an arithmetic pipeline module configured based on a pipeline depth value and a calculation parallelism value, according to certain embodiments.

FIGS. 5 and 6 are exemplary illustrations of an arithmetic pipeline module 502, 602 configured based on a pipeline depth value and a calculation parallelism value, according to certain embodiments. The arithmetic pipeline module 502, 602 may be the arithmetic pipeline module 214 of FIG. 2. The arithmetic pipeline module 502, 602 is coupled to the static configuration parameters modules 512, 612, which may be static configuration parameters module 208 of FIG. 2, and the calculation configuration module 514, 614, which may be the calculation configuration module 206 of FIG. 2. For simplification purposes, common elements between the arithmetic pipeline module 302 of FIG. 3 and the arithmetic pipeline module 502, 602, such as the pipeline control module 516, 616, the coupled RAM interface 518, 618, the pipeline control module 516, 616, the input parameters module 504, 604, and the output parameters module 510, 610, may not be described herein.

The calculation pipeline depth and parallelism of the arithmetic pipeline module 502, 602 may be optimized in a configurable way to allow a tradeoff between latency, timing, area, and power per application. For example, the arithmetic pipeline module 502 and the arithmetic pipeline module 602 are two examples implementing similar calculations with different pipe stage depths (indicated as M and N) and calculation parallelisms (indicated as x and y), where M<N and y>x. The arithmetic pipeline module 502 illustrates a pipeline with greater calculation parallelism and lesser pipe stage depth than the arithmetic pipeline module 602. In some examples, arithmetic functions may vary between different pipe stages. In other examples, not all arithmetic functions may not activated for each pipe stage. The arithmetic pipeline module 502, 602 may be utilized by a controller, such as the controller 108 of FIG. 1, in certain scenarios. For example, the arithmetic pipeline module 502, 602 may be utilized for normal and performance path scenarios, while exceptions, overlaps between read and write, error, and recovery scenarios may be still handled by the flash translation layer, such as the FTL 150 of FIG. 1.

Figure 7:
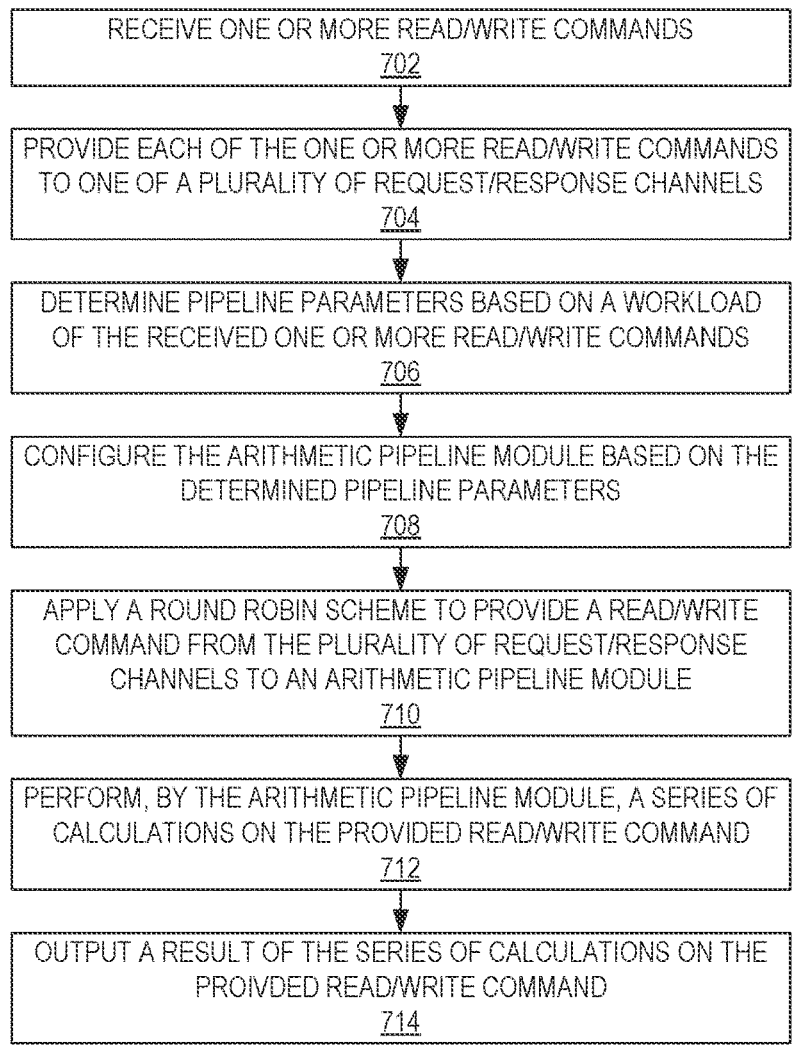
FIG. 7 is a flow diagram illustrating a method of configuring an arithmetic pipeline module, according to certain embodiments.

FIG. 7 is a flow diagram illustrating a method 700 of configuring an arithmetic pipeline module, such as the arithmetic pipeline module 502, 602 of FIGS. 5 and 6, according to certain embodiments. For exemplary purposes, aspects of the storage system 100 of FIG. 1 and the calculation accelerator module 202 of FIG. 2 may be referenced herein.

At block 702, the controller 108 receives one or more read/write commands. At block 704, the controller 108 provides each of the one or more read/write commands to one of the plurality of request/response channels 210. At block 706, the controller 108 determines the pipeline parameters based on a workload of the received one or more read/write commands. It is to be understood that in some embodiments, the controller 108 determines the pipeline parameters in advance, prior to receiving a workload of one or more read/write commands. The pipeline parameters may be retrieved from the calculation configuration module 206 and the static configuration parameters module 208. For example, the workload may be random read, random write, sequential read, sequential write, or a combination of the previously listed workloads.

At block 708, the controller 108 configures the arithmetic pipeline module 214 based on the determined pipeline parameters using the static configuration parameters module 208 and the calculation configuration module 206. The configuring may include adjusting a pipe stage depth and a calculation parallelism. At block 710, the controller 108 applies an arbitration scheme, using the request arbiter 212, to provide a read/write command from the plurality of request/response channels 210 to the arithmetic pipeline module 214. For example, the arbitration scheme may be a round robin scheme. At block 712, the arithmetic pipeline module 214 performs a series of calculations on the provided read/write command. At block 714, an output parameters module, such as the output parameters module 310 of FIG. 3, provides the results of the series of calculations for the provided read/write command to the relevant request/response channel of the plurality of request/response channels 210.

By incorporating a hardware calculation accelerator module in the flash translation layer of the controller, logical-to-physical mapping calculations performance may improve and result in lower latency by utilizing calculation parallelism. Thus, data storage device performance may improve.

In one embodiment, a data storage device includes a memory device and a controller coupled to the memory device. The controller includes a decoder multiplexer (mux) module, a plurality of request/response channels coupled to the decoder mux module, an arithmetic pipeline module coupled to the plurality of request/response channels, an arbiter module coupled to the plurality of request/response channels and the arithmetic pipeline module, a mux/arbiter module coupled to the arithmetic pipeline module, a random access memory (RAM) access module coupled to the decoder mux module and the mux/arbiter module, and a RAM coupled to the mux/arbiter module.

The controller is configured to store static parameters and deliver the static parameters to the arithmetic pipeline module. The arithmetic pipeline module is disposed in a calculation accelerator module of the controller. The controller is configured to determine a calculation configuration based on a received input and provide the calculation configuration to the arithmetic pipeline module of a calculation module of the controller. One or more static parameters are provided to the arithmetic pipeline module based on the calculation configuration. The calculation configuration comprises one or more definitions to set a structure of the arithmetic pipeline module and set an order of calculations of the arithmetic pipeline module. The structure of the arithmetic pipeline module is configurable based on calculation parallelism value and pipeline depth value. The structure comprises a plurality of stages. A number of the plurality of stages is configurable based on the calculation parallelism value and the pipeline depth value. The controller is configured to, for each stage of the plurality of stages, perform a plurality of arithmetic calculations based on the order of calculations. Results of the plurality of arithmetic calculations are provided to a next stage of the plurality of stages. Last results of the plurality of arithmetic calculations are sent to the plurality of request/response channels. The controller is configured to use the plurality of request/response channels to activate the arithmetic pipeline module and to receive calculation results from the arithmetic pipeline module. The controller further comprises a plurality of central processing units (CPUs). Each CPU is associated with a request/response channel of the plurality of request/response channels. The arbiter module is configured to arbitrate between the plurality of request/response channels when a threshold number of outstanding requests of the arithmetic pipeline module is exceeded. The controller is configured to store configurations/databases that are greater than a threshold size in the RAM.

In another embodiment, a data storage device includes a memory device and a controller coupled to the memory device. The controller includes an arithmetic pipeline module. The controller is configured to determine a pipeline depth value and a calculation parallelism value of the arithmetic pipeline module and configure the arithmetic pipeline module based on the determining. The pipeline depth value is a number of stages to perform a series of calculations and the calculation parallelism value is a number of parallel arithmetic elements of each calculation of the series of calculations. Each calculation of the series of calculations includes a plurality of distinct arithmetic elements.

The arithmetic pipeline module comprises a pipeline control module coupled to the arithmetic pipeline module. The pipeline control module is configured to control an operation of the arithmetic pipeline module according to values of one or more registers located in a calculation configuration storage location of the controller. The values are used to determine the pipeline depth value and the calculation parallelism value. The plurality of distinct arithmetic elements further includes an arithmetic element having a configurable, algorithm-specific calculation. The pipeline depth value is a first value and the calculation parallelism value is a second value. The first value and the second value are configured based on a tradeoff between latency, timing, area, and power per application.

In another embodiment, a data storage device includes memory means and a controller coupled to the memory means. The controller includes a plurality of multiplexers, a plurality of arithmetic elements, and a plurality of registers and/or a plurality of flip-flops. The controller is configured to determine a pipeline depth value and a calculation parallelism value and configure an arithmetic pipeline module based on the pipeline depth value and the calculation parallelism value. The configuring includes selecting and deselecting one or more multiplexers of the plurality of multiplexers, one or more arithmetic elements of the plurality of arithmetic elements, and one or more registers of the plurality of registers and/or one or more flip flops of the plurality of flip-flops.

The plurality of arithmetic elements is selected from a group consisting of dividers, multipliers, adders, subtractors, comparators, shifters, multiplexers, and combinations thereof. The plurality of arithmetic elements is predetermined.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller comprises:
   a decoder module;
   a plurality of response channels coupled to the decoder module;
   an arithmetic pipeline module coupled to the plurality of response channels;
   an arbiter module coupled to the plurality of response channels and the arithmetic pipeline module;
   a mux module coupled to the arithmetic pipeline module;
   a random access memory (RAM) access module coupled to the decoder module and the mux module; and
   a RAM coupled to the mux module.

2. The data storage device of claim 1, wherein the controller is configured to store static parameters and deliver the static parameters to the arithmetic pipeline module, wherein the arithmetic pipeline module is disposed in a calculation accelerator module of the controller.

3. The data storage device of claim 1, wherein the controller is configured to determine a calculation configuration based on a received input and provide the calculation configuration to the arithmetic pipeline module of a calculation module of the controller.

4. The data storage device of claim 3, wherein one or more static parameters are provided to the arithmetic pipeline module based on the calculation configuration.

5. The data storage device of claim 3, wherein the calculation configuration comprises one or more definitions to set a structure of the arithmetic pipeline module and set an order of calculations of the arithmetic pipeline module.

6. The data storage device of claim 5, wherein the structure of the arithmetic pipeline module is configurable based on calculation parallelism value and pipeline depth value, wherein the structure comprises a plurality of stages, and wherein a number of the plurality of stages is configurable based on the calculation parallelism value and the pipeline depth value.

7. The data storage device of claim 6, wherein the controller is configured to, for each stage of the plurality of stages, perform a plurality of arithmetic calculations based on the order of calculations.

8. The data storage device of claim 7, wherein results of the plurality of arithmetic calculations are provided to a next stage of the plurality of stages, and wherein last results of the plurality of arithmetic calculations are sent to the plurality of response channels.

9. The data storage device of claim 1, wherein the controller is configured to use the plurality of response channels to activate the arithmetic pipeline module and to receive calculation results from the arithmetic pipeline module.

10. The data storage device of claim 1, wherein the controller further comprises a plurality of central processing units (CPUs), and wherein each CPU is associated with a request/response channel of the plurality of response channels.

11. The data storage device of claim 1, wherein the arbiter module is configured to:
   arbitrate between the plurality of response channels when a threshold number of outstanding requests of the arithmetic pipeline module is exceeded; and
   provide an outstanding request to the arithmetic pipeline module based on the arbitrating.

12. The data storage device of claim 1, wherein the controller is configured to store configurations/databases that are greater than a threshold size in the RAM.

* * * * *